United States Patent

Miyasaka et al.

[11] Patent Number: 5,895,119
[45] Date of Patent: Apr. 20, 1999

[54] COMPOSITE POROUS BEARING

[75] Inventors: Motohiro Miyasaka; Makoto Kondo, both of Chiba-ken; Shigeru Otsuka, Osaka, all of Japan

[73] Assignees: Hitachi Powered Metals Co., Ltd.; Matsushita Electric Industrial Co., Ltd., both of Japan

[21] Appl. No.: 08/757,835

[22] Filed: Nov. 27, 1996

[30] Foreign Application Priority Data

Nov. 30, 1995 [JP] Japan ................... 7-313042

[51] Int. Cl.$^6$ .................................................. F16C 33/24
[52] U.S. Cl. ................................... 384/279; 384/902
[58] Field of Search ........................... 384/279, 902

[56] References Cited

U.S. PATENT DOCUMENTS

| | | | |
|---|---|---|---|
| 2,227,307 | 12/1940 | Hildabolt | 384/279 |
| 2,698,774 | 1/1955 | Haller et al. | 384/902 X |
| 2,800,373 | 7/1957 | Kablick et al. | 384/279 X |
| 3,352,612 | 11/1967 | Eudier | 384/279 |
| 3,445,148 | 5/1969 | Harris et al. | 384/279 |
| 4,715,731 | 12/1987 | Tittizer | 384/279 X |

FOREIGN PATENT DOCUMENTS

| | | | |
|---|---|---|---|
| 44-22002 | 9/1969 | Japan . | |
| 484311 | 6/1971 | Japan . | |
| 4818789 | 7/1971 | Japan . | |
| 48-39464 | 11/1973 | Japan . | |
| 51-53387 | 12/1976 | Japan . | |
| 57-110823 | 7/1982 | Japan . | |
| 58-094628 | 6/1983 | Japan . | |
| 62-149803 | 7/1987 | Japan . | |
| 62-151502 | 7/1987 | Japan . | |
| 01242821 | 9/1989 | Japan . | |
| 02107705 | 4/1990 | Japan . | |
| 2-65714 | 5/1990 | Japan . | |
| 03240901 | 3/1991 | Japan . | |
| 04075443 | 3/1992 | Japan . | |
| 5884222 | 8/1993 | Japan . | |
| 06070504 | 3/1994 | Japan . | |
| 6-185528 | 7/1994 | Japan | 384/279 |

*Primary Examiner*—Thomas R. Hannon
*Attorney, Agent, or Firm*—McDonnell, Boehnen, Hulbert & Berghoff

[57] ABSTRACT

A bearing comprising different materials having oil-filled pores in them has a relief space in the middle section which is not provided by machining. The materials are different, have different characteristics, and bear different portions of load the bearing supports, resulting in longer bearing life and reduced noise. Materials 1 and 2 are separately formed and sintered in such a way that material 1 has smaller pores in it and can support higher load, material 2 has larger pores in it and can support lower load, and an end portion of each material is stepped so that material 1 can be partially inserted into material 2 and a relief space is provided on the inner periphery of material 1. The materials 1 and 2 are then joined together into one piece, and the one piece is placed in a sizing die and pressed. The sized one piece is a strong one-piece bearing having an accurate inside diameter and good concentric alignment.

12 Claims, 2 Drawing Sheets

COMPOSITE POROUS BEARING

BACKGROUND OF THE INVENTION

1. Field of the Invention

This invention relates to a composite porous bearing with its pores filled with lubricant oil, and a method of making such a bearing. More specifically, the invention relates to a slide bearing supporting a rotating shaft of an axial-flow fan motor or other rotating devices, and a method of making such a bearing.

2. Description of the Related Art

Many ideas are known in the conventional art in relation to a so-called mid-relief bearing where the inside diameter of the middle section is larger than that of either end section. Japanese Patent Laid-open No. 57-110823 and Japanese Patent Laid-open No. 58-94628 relate to a mid-relief bearing manufactured by first removing part of the outer surface of the middle section to make the walls of the middle section thinner and by expanding outwardly the thinner walls from inside to make the inside diameter of the middle section larger during a sizing process. Also, Japanese Patent Publication No. 60-54525 and Japanese Patent Laid-open No. 1-242821 relate to a method of making a mid-relief bearing by sizing a bearing with a special die so that the inside diameter of the middle section gets larger. Japanese Patent Laid-open No. 62-149803 and Japanese Patent Laid-open No. 62-151502 also use similar methods.

Further, Japanese Patent Laid-open No. 2-107705 uses a crowned sizing core during a sizing process and removes it by spring-back. Japanese Utility Model Publication No. 51-53387 and Japanese Patent Laid-open No. 3-240901 make the inside diameter of the middle section larger by means of the pressure applied to the bearing as it is pressed fit into a housing.

All the methods mentioned above obtain a one-piece bearing with a larger inside diameter at the middle section by means of plastic deformation caused by either a special die in a forming process or the press-fit pressure in a housing process, for the purpose of reducing friction found with a long bearing having a relatively large bearing area. These methods have advantage over an earlier three-piece bearing which uses two separate bearing parts and a housing to form a mid-relief bearing assembly. A major advantage is high performance with reduced cost due to the simpler one-piece structure.

Another Japanese Patent Laid-open No. 6-70504 discloses a long-life porous bearing featuring effective use of lubricating oil where the high-load and low-load materials have oil-filled pores of different sizes and are joining together, and oil circulates from the low-load material to the high-load material through their pores by capillary. Another Japanese patent Japanese Utility Model Laid-open No. 2-65714 discloses a long-life porous bearing consisting of two sintered porous materials with pores of different sizes where oil returns into the larger pores in one material and then advances by capillary through the smaller pores in the other material.

Another Japanese Patent Laid-open No. 4-75443 prevents oil leakage by providing the peripheral area of a bearing with oil-collecting grooves. Japanese Utility Model Publication No. 48-39464, Japanese Utility Model Publication No. 44-22002, and Japanese Utility Model Laid-open No. 48-4311 also use similar techniques. In these methods, the grooves in the outside peripheral area allow oil to pass through them, not only preventing oil leakage but improving cooling effect, and an oil-filled felt or other oil supplying means ensures a longer-life bearing.

A mid-relief bearing as mentioned above can reduce bearing friction, but suffers from an accuracy problem in a sizing process because either the middle section is expanded or the end sections are squeezed during a sizing process to make the inside diameter of the middle section larger. Especially, it is practically impossible to control the distribution of pores over the inner peripheral areas because of the one piece manufacturing method. Also it is difficult to make the inside diameters, or the concentric alignment, the shaft-joining end sections accurate. When compared with a three piece bearing assembly where two bearing materials are assembled into a housing, the one piece bearing more quickly deteriorates in performance, requires more lenient dimensional tolerances, has less stable bearing characteristics, and thereby leads to an unsatisfactory product yield.

For a bearing made of different materials tightly joining together and having oil-filled pores, which may be different in size, longer life can be expected due to oil circulation through pores, but tight junction between the materials is assured only by the press-fit pressure at the time of incorporation into a housing and not easily ensured or confirmed. Also, tight junction between the materials is difficult to achieve and may fail to assure effective oil circulation, because the joining areas are sometimes not large enough or have relatively coarser texture than inner or outer peripheral areas. Another problem with this type of bearing is that other sintered materials are necessary outside the bearing to collect and return oil to the bearing, adding to the cost.

While any bearing made by powder-material metallurgy is formed, sintered, sized, and assembled into a housing during manufacturing, some of the conventional art assembles two or more formed materials into one bearing assembly and subjects the assembly to a sintering process ensuring tight junction between materials by making use of the diffusion effect of the process. Some of the conventional art forms, sinters, and sizes bearing materials separately, and joins them together in a press-fit assembly process.

The method in which formed materials are assembled together and then sintered suffers poor workability due to the weak strength of formed materials, as well as limited allowable combination of materials due to the requirements of a sintering process. The method in which materials are sized separately before assembled together requires an additional process of inside diameter correction to make the inside diameters, and the concentric alignment, of the materials accurate and have a desired distribution of pores. Additional process means additional cost.

SUMMARY OF THE INVENTION

It is an object of the present invention to provide a bearing featuring maintenance free, long life, low friction loss, low vibration, and low noise.

To achieve the above object, a composite porous bearing according to the present invention comprises at least two porous materials having different pores in size which are joined together into one piece, preferably at least in part joined together into one piece in a radial direction before the bearing is assembled into a housing.

In a series of forming, sintering, sizing, and housing processes through which a composite porous bearing is manufactured according to the present invention, individual materials should preferably be formed and sintered before joined together into one piece and then sized.

Two or more different materials having pores of different sizes to form a present invention should preferably have different natural vibration characteristics so as to reduce noise or vibration.

It is another object of the present invention to provide a low-friction bearing by making the end sections, or the end sections and the middle sections of the bearing smaller in inside diameter and by providing a space near the junction of the materials. The space may be used to contain an oil supply means.

The end sections, or the middle sections of smaller inside diameter should preferably be different in bearing surface area so as to bear different amounts of load for better load distribution, leading to longer life and lower vibration.

Materials are not necessarily different and having pores of different sizes. Different materials having pores of the same size, or the same materials having pores of different sizes may be used. Therefore, the present invention includes a bearing made of different materials having pores of the same size, and a bearing made of the same materials having pores of different sizes.

Other objects and features of the invention should be easily understood by a person skilled in the art by reviewing attached drawings and related description herein. Actually the invention should bring about many other benefits.

DETAILED DESCRIPTION OF THE INVENTION

Figure 1:
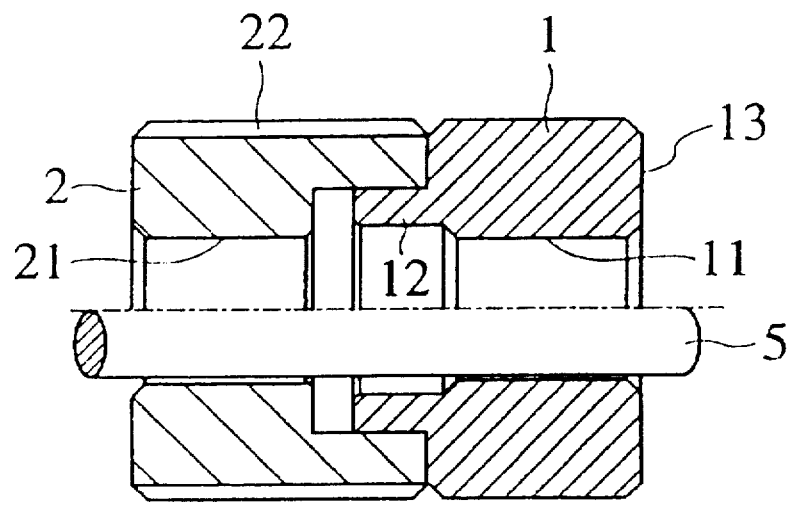
FIG. 1 shows an embodiment of the present invention. The upper half of the drawing is a cross-sectional view of a bearing without a shaft inserted, and the lower half of the drawing is a cross-sectional view of the same bearing with a shaft inserted in it.

Referring to FIG. 1, the material 1, as shown on the right side of the drawing, is a sintered alloy, bears higher load, and has smaller pores in it. The material 2, as shown on the left side of the drawing, is a sintered low cost alloy, bears smaller load, and has larger pores in it. The inner periphery of the right part of the material 1 is the bearing surface 11 defining the inside diameter of the bearing. There is a relief space 12 adjacent to the bearing surface 11 defined by the inner periphery of the left part of the material 1 such that the relief space 12 is larger than the bearing surface 11 in diameter. The left part of the material 1 and the right part of the material 2 are stepped so that the material 1 partially enters into the material 2 tight and snug. The outer periphery of the material 2 has grooves 22 on it. The grooves 22 are designed to collect and help circulate oil which expands due to friction heat and leaks out of the bearing. Oil cools as it circulates. The relief space 12, the stepped parts, and the grooves 22 are shaped when the materials 1 and 2 are formed separately in a die from raw powder material. The materials 1 and 2 as formed are joined together as shown in FIG. 1 and the one-piece composite bearing is put in a sizing die with a sizing core inserted in it and undergoes a sizing process. Now the junction between the materials 1 and 2 is stronger, and the bearing surfaces 11 and 21 are finished and aligned to a designed accuracy. Then the bearing is provided with lubricant oil, and undergoes post processes similar to those found in the conventional art. A bearing according to the present invention may be used for an application where the end face 13 of the material supporting higher load is subjected to thrust load. In this case, the end face 13 may undergo a partial-deformation process or a dynamic-pressure process as disclosed in Japanese Utility Model Laid-open No. 48-18789 to improve its performance. In order to prevent wasting of lubricant oil by oozing out from the surface other than the bearing surface, the bearing is accommodated in the groove provided on the rotating plate. With this rotating plate held clamped, a plate fixed with a tool is provided so as to effect binding of the end face of the sintered oil-containing bearing efficiently. By using a bearing provided with such processing, the lubrication effect can be kept for a long duration.

A composite bearing thus manufactured has improved natural vibration characteristics because the materials 1 and 2 are different and have different natural vibrations. Longer life, lower vibration, and lower noise with a bearing according to the present invention was confirmed in an endurance test using an axial-flow fan.

Figures 2A, 2B:
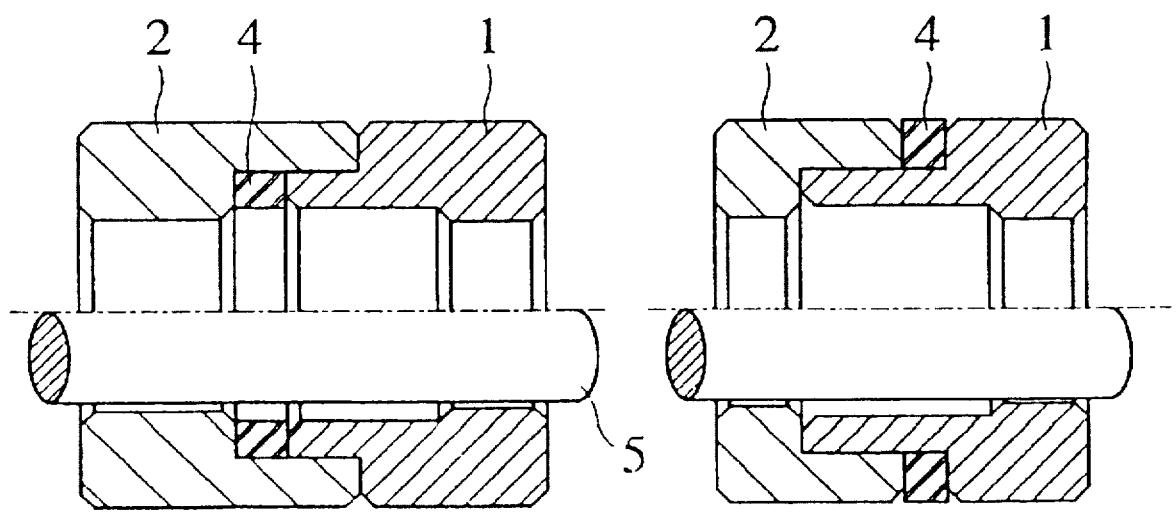
FIGS. 2A and 2B show other embodiments of the present invention, wherein an oil supplying means is contained in a space (either on the inner or outer periphery of the bearing) adjacent the junction of the two bearing materials. The upper half of each drawing is a cross-sectional view of a bearing without a shaft inserted, and the lower half of each drawing is a cross-sectional view of a bearing with a shaft inserted in it.

FIGS. 2A–4 show other embodiments of the present invention. Referring to FIGS. 2A and 2B, the material 1 is partially inserted into, the material 2 in different ways such that a space is provided either on the outer or inner periphery to receive an oil-soaked felt or other oil supplying means 4 for the purpose of increasing the amount of oil stocked and thereby extending life. FIGS. 2A and 2B show a bearing with its oil supplying means on the inner or outer periphery respectively.

Figure 3A:
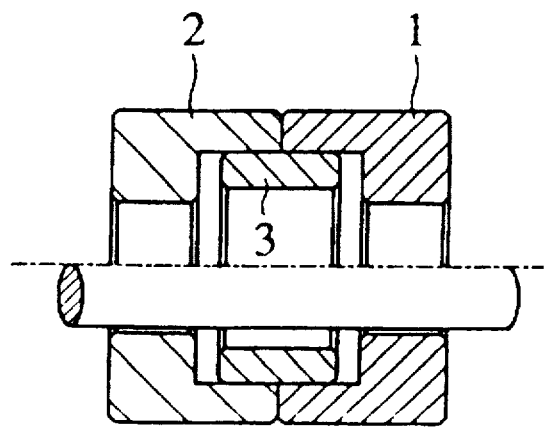
FIGS. 3A and 3B show still other embodiments of the present invention, wherein three bearing materials are used. The upper half of each drawing is a cross-sectional view of a bearing without a shaft inserted, and the lower half of each drawing is a cross-sectional view of a bearing with a shaft inserted in it.
Figure 3B:
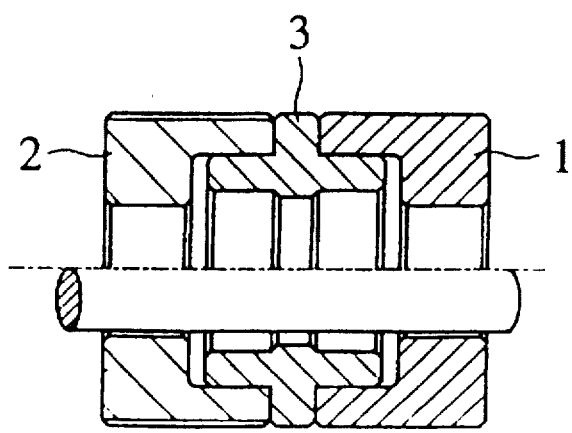

FIGS. 3A and 3B show two embodiments of the present invention using three materials. FIG. 3A shows a bearing wherein load is borne by two end materials, while FIG. 3B shows a bearing wherein load is borne by two end materials and one center material. In either drawing, the right material bears highest load, and the pores in the left, middle, and right materials are largest, middle, and smallest in size respectively. The end face of the right material is partially deformed and treated so as to resist dynamic pressure.

Figure 4:
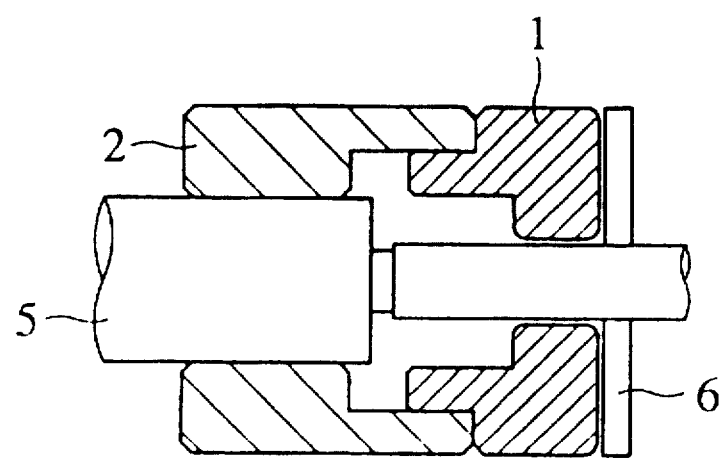
FIG. 4 shows still another embodiment of the present invention, wherein each bearing materials with different bearing surface areas are used. The drawing is a cross-sectional view of a bearing with a combination shaft inserted in it.

Referring to FIG. 4, the right material supporting higher load and the left material supporting lower load have different bearing surfaces in area. The end face of the right material having smaller pores in it is partially deformed and treated so as to resist dynamic pressure. A thrust washer 6 is also provided.

Endurance tests of the above mentioned embodiments have revealed the following: the bearings consisting of three materials as shown in FIGS. 3A and 3B are as good as those consisting of two materials as shown in FIGS. 2A and 2B in life, vibration, and noise characteristics; the bearings provided with an oil-supplying means as shown in FIG. 2 are a little better than those with neither oil-supplying means nor anti-dynamic pressure feature as shown in FIG. 1 in life characteristics; and a bearing having a plurality of bearing surfaces which are different from each other in area as shown in FIG. 4 is better than that having a plurality of bearing surfaces of the same area in life and vibration characteristics because of more optimized distribution of oil among materials according to actual load distribution.

Effects of a composite porous bearing according to the present invention are now described below.

According to the present invention, sintered materials are joined together to form a one-piece bearing and then the bearing is subjected to a sizing process. Therefore, in the sizing process, the bearing is sized and finished to have an ideal distribution of pores, an accurate inside diameter, and a good concentric alignment at the same time. Because sintered materials are strong, it is easy to handle and assemble them into a bearing. Because materials are sintered separately, less strict sintering requirements apply. For example, a sintered iron-based material and a sintered copper-based material can be used to make a composite bearing. Similarly, low friction, high wear-resisting resins, for example ROM, PPS, PTFE, and fluorine-, silicon-, urethan-, or nitrile-based elastomers can form porous materials.

Unlike the method in which materials are first sized separately and then assembled into a composite bearing, the present method sizes an assembled bearing, and simplifies the sizing process as well as eliminates the need of press fit sizing normally required in a housing process to correct inside diameters, and then results in reduced processes, improves workability, and increases cost efficiency. As discussed earlier, a mid-relief bearing manufactured according to the present invention features controlled distribution of pores, high dimensional accuracy, and good concentric alignment. Also, the freedom in selecting a combination of materials allows such a combination that one material is suitable for thrust bearing and the other for radial bearing.

According to the present invention, sintered materials having pores of different sizes are joined together and then sized as a whole. Therefore, the junction between materials, especially at the interface between the inner periphery of one material and the outer periphery of the other, is so good that oil can easily circulate from one material to the other through the pores. While the degree of such junction cannot be confirmed with the conventional art wherein materials are joined together, sharing a small junction area, only after assembled in a housing, it can easily be confirmed with the present invention and so reliable as to eliminate the need of such confirmation.

An embodiment of the present invention includes an oil collecting space formed by the materials joining together. The space prevents oil from leaking out. If a felt 4 or other oil supplying means is put in the space, longer bearing life can be expected. The space may be either on the inner or the outer periphery of the bearing as shown in FIG. 2.

Grooves may be formed on the periphery of the bearing. More specifically, grooves may be formed only on the periphery of the low-load material to supply and circulate oil, while the high-load material with no grooves can bear higher load with minimum oil leakage. With this configuration, some benefits are obtained from active oil circulation as explained below.

On the high-load side (thrust load side), friction heat accumulates and oil expands and tends to leak out through the pores. The end face 13 bears a thrust and therefore prevents oil from leaking. The oil has no choice but moving to the other side (low-load side), which has pores and is provided with grooves so as to collect the oil easily. The collected oil returns to the high-load side by capillary action because of the difference in pore size. Better oil circulation means longer bearing life.

Another benefit of a composite bearing consisting of a plurality of porous materials having different natural vibrations is that the chance and the degree of resonance is small and the overall vibration of the bearing can be kept small. If porous materials had the same natural vibration, the bearing would easily resonate and the vibration and noise would be large.

Another embodiment of the present invention consists of materials of different length or inside diameter so as to have different bearing surface areas as shown in FIG. 4. With this configuration, PV values can be controlled and natural vibrations of materials can be adjusted to prevent resonance, resulting in longer life, lower vibration, and improved performance.

The present invention provides a long-life, high-performance, composite porous bearing combining different materials of different sizes and shapes to obtain a required degree of oil circulation and a required distribution of natural vibrations, ensuring longer life, lower vibration, lower noise, and improved performance.

For these advantages, the present invention is most suitable for an axial-flow fan motor bearing or other applications where long life, low vibration, and low noise are requisite. Because of its unique manufacturing method, the present invention also ensures high accuracy with reduced production processes and cost. Unlike a conventional art requiring incorporation of separate materials in a housing with precision, the present invention is a one-piece bearing having a built-in accuracy, and requires no additional sizing during a housing process.

As easily understood by a person skilled in the art, the shape of the stepped parts of materials by which they engage each other can be modified in various ways while still being within the scope of the present invention.

Although the present invention has been described in detail, it should be understood that various substitutions, alterations and changes may be made hereto without departing from the spirit and scope of the invention as defined by the appended claims.

What is claimed is:

1. A composite porous bearing comprising at least two porous materials having different pores in size said materials being joined together into one piece before being assembled into a housing; said at least two porous materials comprise a first piece and a second piece, wherein each of said first and second pieces comprise a first end section, a middle section, and an opposite end section, said first end section having a first inside diameter and said middle and opposite sections having a second inside diameter, wherein said first inside diameter is less than said second inside diameter.

2. A composite porous bearing comprising at least two porous materials having different pores in size, said materials being joined together into one piece before being assembled into a housing; wherein said at least two porous materials having different pores in size are joined together at a junction into one piece before being assembled into a housing, and a space is provided adjacent to said junction of said materials.

3. A composite porous bearing comprising at least two porous materials having different pores in size, said materials being joined together into one piece before being assembled into a housing, wherein a space is provided adjacent to the junction of said materials, and said space contains an oil supplying means.

4. A composite porous bearing comprising at least two porous materials having different pores in size, said materials being joined together into one piece before being assembled into a housing; wherein at least a part of said materials is joined together by force in a radial direction into one piece before being assembled into a housing.

5. A composite porous bearing comprising at least two different materials, said materials being joined together into one piece before being assembled into a housing in a composite type bearing assembly, wherein said different materials comprise materials having different natural vibration characteristics.

6. A composite porous bearing as described in claim 5, wherein said least two porous materials have different pores in size and are joined together into one piece to create a junction thereof before being assembled into a housing, and wherein a space is provided adjacent to said junction of said materials.

7. A composite porous bearing as described in claim 5, wherein said least two porous materials have different pores in size and are joined together into one piece to create a junction thereof before being assembled into a housing, and wherein a space is provided adjacent to said junction of said materials, and fuirther comprising an oil supplying means provided within said space.

8. A composite porous bearing as described in claim 5, wherein said at least two porous materials comprise a composite material produced in accordance with a sequential process of molding, sintering, assembly into a housing and then repressing, and wherein said processes of molding and sintering are performed separately on said at least two porous materials, followed by said steps of assembly and repressing.

9. A composite porous bearing as described in claim 5, wherein said at least two different materials are joined together into a single piece before being assembled into a housing, said single piece comprising first and second opposite end sections and a middle section between said opposite end sections, and wherein said first end section has a first inside diameter and said middle section and second end section have a second inside diameter, said second inside diameter less than said first inside diameter.

10. A composite porous bearing as described in claim 5, wherein said at least two different materials are joined together into one piece before being assembled into a housing, wherein said at least two different materials comprise a first piece having a peripheral end portion having an outside diameter thereof and a second piece having a peripheral end portion having a inside diameter thereof, said inside and outside diameters of said peripheral end portions provided such that said first and second peripheral end portions thereof snugly overlap in a radial direction when said first and second pieces are joined together into a single piece.

11. The composite porous bearing as described in claim 5, wherein at least a part of said two materials is joined together in a radial direction to form a single piece before being assembled into a housing.

12. A composite type porous bearing comprising a first piece and a second piece, said first and second pieces having different pore sizes, said first and second pieces being joined together into single unit before being assembled into a housing of a composite type bearing assembly, wherein said first and second pieces have different natural vibration characteristics, and wherein said first and second pieces are made from the same material.

* * * * *

UNITED STATES PATENT AND TRADEMARK OFFICE
CERTIFICATE OF CORRECTION

PATENT NO. : 5,895,119
DATED : April 20, 1999
INVENTOR(S) : Miyasaka et al.

It is certified that error appears in the above-identified patent and that said Letters Patent is hereby corrected as shown below:

Title page,
Item [73], the name of the Assignee Hitachi should be: -- Hitachi Powdered Metals Co., Ltd. --

Drawings,
Delete Figure 3B and substitute therefore the Figure 3B, as shown.

FIG.3B

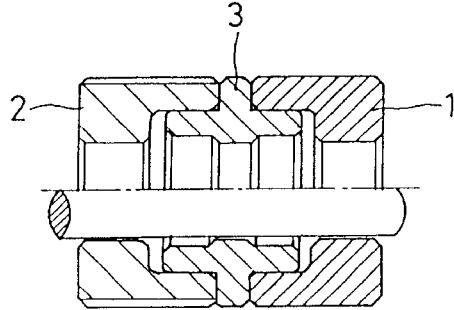

Column 4,
Line 39, delete comma between "into" and "the".

Column 6,
Line 49, add a comma after "size".

Signed and Sealed this

Twenty-third Day of July, 2002

*Attest:*

*Attesting Officer*

JAMES E. ROGAN
*Director of the United States Patent and Trademark Office*